UNITED STATES PATENT OFFICE.

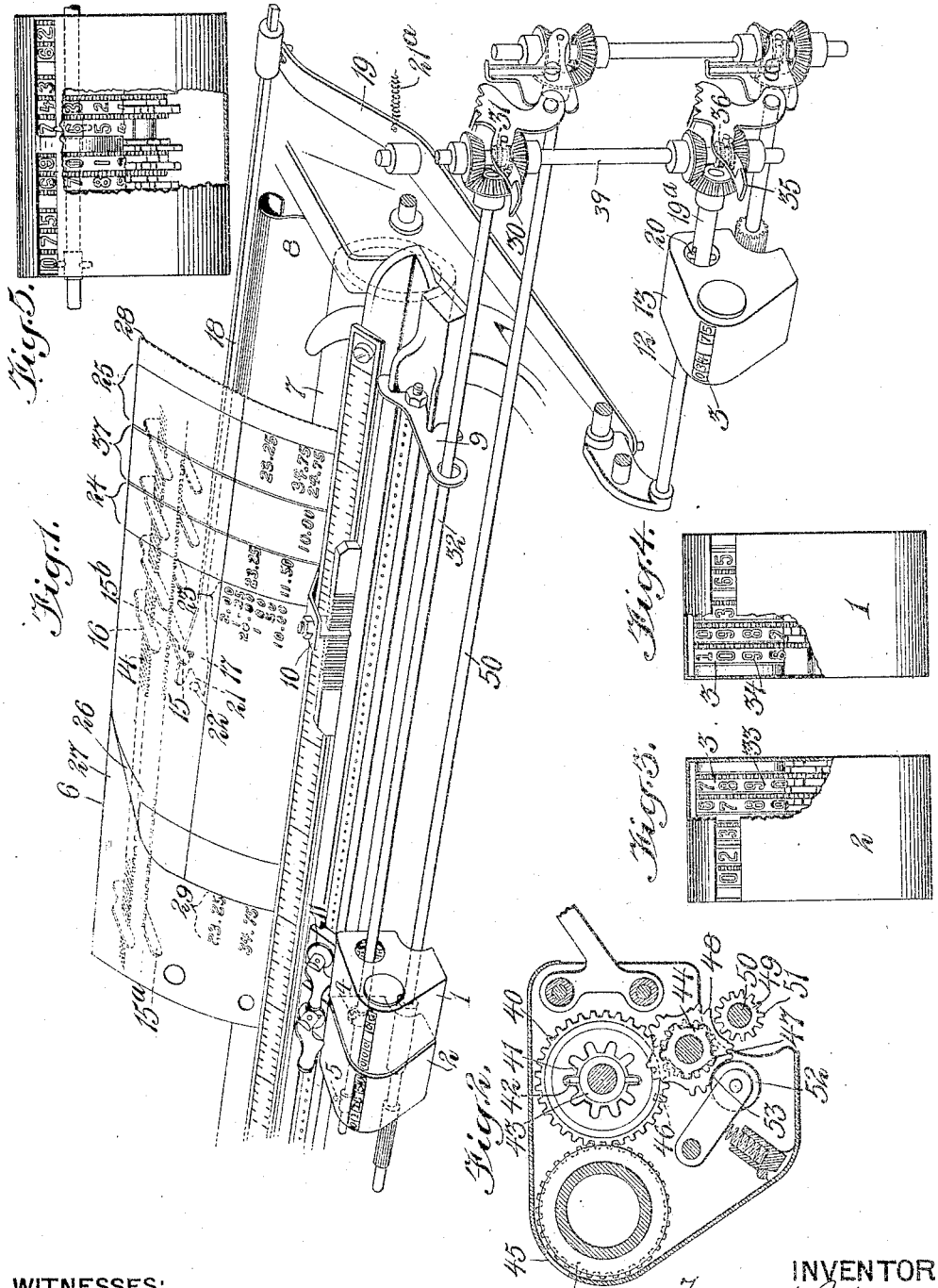

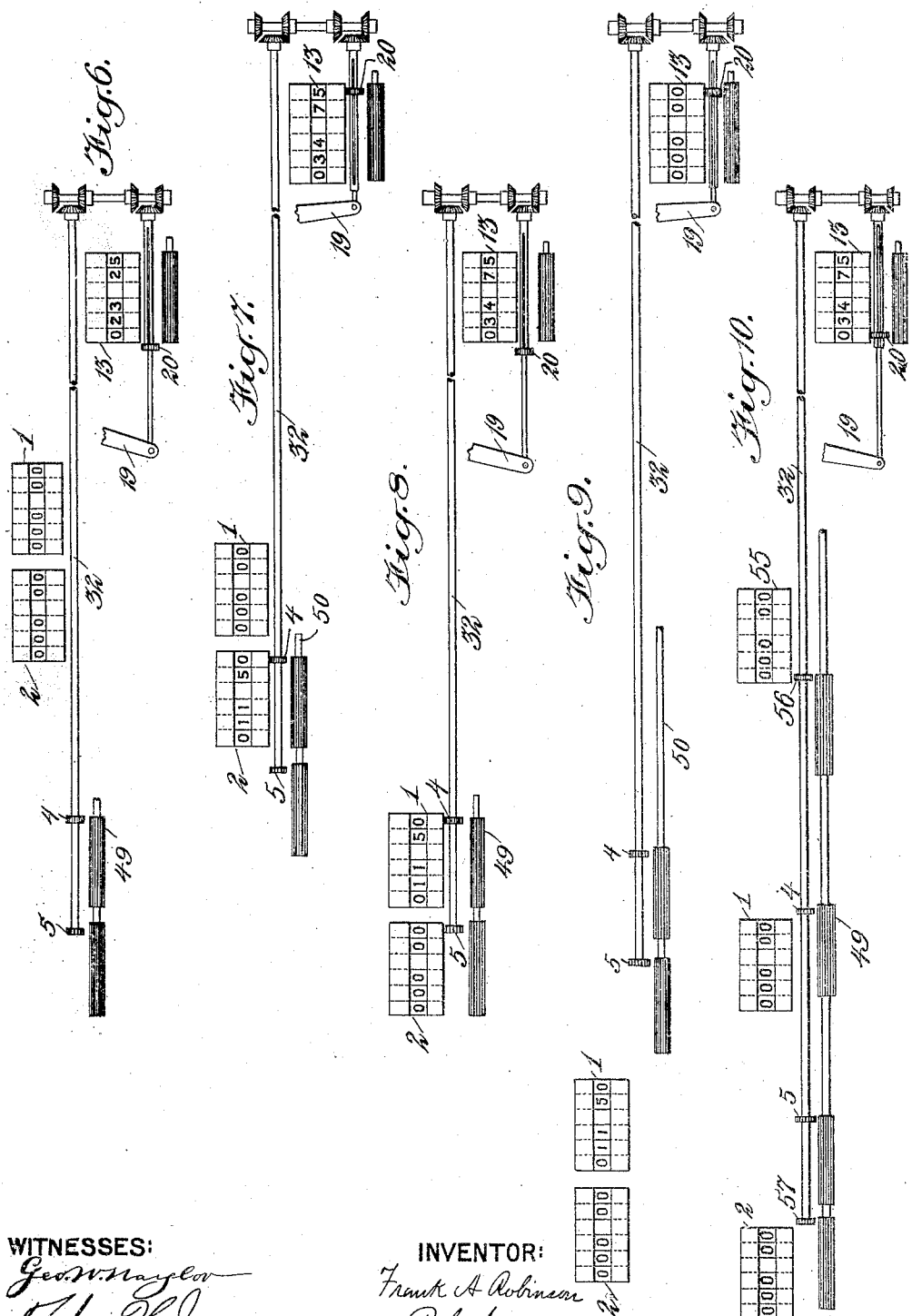

FRANK A. ROBINSON, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,294,537.     Specification of Letters Patent.     Patented Feb. 18, 1919.

Application filed August 30, 1913. Serial No. 787,403.

*To all whom it may concern:*

Be it known that I, FRANK A. ROBINSON, a citizen of the United States, residing in Brooklyn borough, city of New York, in the county of Kings and State of New York, have invented certain new and useful Improvements in Combined Type-Writing and Computing Machines, of which the following is specification.

My invention relates to computing machines, and is herein shown as applied to a combined typewriting and computing machine of the Underwood-Wright type. In such machines the carriage of the typewriter causes a computing machine carriage to travel so that a master wheel engages *seriatim* the computing wheels of a totalizer, said master wheel being power-driven, so that it turns said wheels to cause said totalizer to register the numbers written by the numeral keys of the typewriter.

For the purposes of the present improvements, such combined machines may be provided with a plurality of master wheels and totalizers, and may also include a second computing machine carriage which controls the relation of another power-driven master wheel to another totalizer. This second computing machine carriage may be connected so as to travel intermittently with the typewriter carriage in each letter-feeding traverse of said typewriter carriage, and thus said second computing machine carriage may cause the master wheel which it controls to do cross adding in its totalizer.

The first-named totalizers may be operated by master wheels fast on a single shaft, and said totalizers may be so adjusted on the carriage that as the typewriter carriage travels along these totalizers may be simultaneously operated by said master wheels, or may be separately operated thereby.

When two totalizers are thus simultaneously operated, one may always subtract when the other adds. The result of this is that when the numeral keys are operated to register in these two totalizers simultaneously, said keys will take out of one totalizer the number which is inserted into the other. This combination of two totalizers operated simultaneously from a single master wheel shaft is especially valuable in such work as making out bills, where it is desired to add the items in one totalizer, and when the writing of the items has been verified, the total of said items may be transferred into a grand total totalizer. The accuracy of such a transfer may be proved by simultaneously subtracting the number shown therein out of the item totalizer, thus bringing its wheels to register zero. The fact that the wheels register zero in the item totalizer is proof that the number has been correctly registered in the grand total totalizer.

If these two totalizers, as suggested above, are operated by master wheels fast on a single shaft, there are no connections between said two totalizers which an operator might accidentally set wrongly. Thus said structure prevents such mistakes as an operator might make in manually setting connections to effect the same result.

If the cross totalizer is connected to be operated simultaneously with either of the other totalizers, it may be connected so as to either add or subtract the numbers registered in either or both of said totalizers.

In one form of structure, items while being written on a bill, are first added simultaneously on the item totalizer and on the cross totalizer; then when the total thus obtained is transcribed on the bill, it is subtracted out of the item totalizer while the cross totalizer is ineffective, but while the grand total totalizer is effective. This, as above described, brings the item totalizer to zero and thus forms a check on the accuracy of the work.

Any credits may now be written so as to be inserted in a credit totalizer and simultaneously deducted from the cross totalizer. After this is done, the cross totalizer will show the balance. Said balance may now be transcribed on the bill and the numeral keys may be so connected that transcribing said balance will subtract said balance out of the cross totalizer, thus bringing the numeral wheels of said cross totalizer to zero, and proving the accuracy of said transcribing.

From the above outline, it will be observed that while my invention need not complicate the machine with a large number of automatic shifting devices, yet it does provide the machine with a sufficient number of totalizers so linked together that the tracing out of an error is a fairly simple matter through all the stages of making out a bill, and that the operator is able to prove the accuracy of his work at various stages by the fact that when said work is correctly done, the wheels of certain totalizers will stand at zero.

Other features and advantages will appear hereinafter.

In the accompanying drawings,

Figure 1 is a perspective front view of the upper front portion of an Underwood-Wright combined typewriting and computing machine showing the present improvements and enough of the computing machine to show how they are connected thereto.

Fig. 2 is a sectional side view of a totalizer.

Figs. 3 and 4 are views partly broken away, showing the arrangement of the numerals on two totalizers seen together in Fig. 1.

Fig. 5 is a view of an alternative form in which the two totalizers are combined.

Fig. 6 is a diagram spread out to show the connections when writing in the first column.

Fig. 7 is a similar diagram showing the connections when writing in the second column, as shown in Fig. 1.

Fig. 8 is a similar diagram showing the connections when computing in the third column.

Fig. 9 is a similar diagram showing the connections when computing in the last or total column.

Fig. 10 is a similar diagram showing the connections when computing in the next to the last or credit column, including also a totalizer for said column.

In adapting the machine for a particular style of work, I employ a temporary or sub-totalizer 2 on which items are to be footed as written, and a permanent main or grand totalizer 1 on which the footings of the items are to be transferred. Said totalizers are so arranged that the dial wheels 3 therein are engaged *seriatim* by master wheels 4 and 5. For convenience the machine is illustrated as adapted to make out bills whereon are shown the items of sales for each day, the total of said items, the credits of the day, and the total daily balance. For this purpose a bill 6 is passed around the platen 7 of the typewriter, and the amounts are written out on said bill by the usual numeral keys of the typewriter, not shown herein, in any usual or desired manner, said keys operating the usual types. Said platen 7 is mounted in the usual Underwood typewriter carriage 8 and said carriage carries along with it, as it moves in either direction, a computing machine carriage 9 to which it is attached by a removable arm 10. On this computing carriage the totalizers 1 and 2 are suitably adjusted by clamps 11, so that when the operator shifts the typewriter carriage 8 to write in any column on the bill 6, the totalizers will be moved with said carriage, and if either then engages with one of the master wheels 4 or 5, said totalizer will register the number which is being written by the numeral keys of the typewriter.

The machine, as shown herein also comprises a second computing carriage 12, which is arranged to be intermittently connected to the typewriter carriage in such a way that numbers written in a plurality of columns will be registered on a third totalizer 13 in a manner determined by said second computing carriage 12; said second computing carriage 12 may be connected to the typewriter carriage in the manner disclosed in the co-pending case of Walter Wright, Serial Number 574,813, filed August 1, 1910, wherein the usual tabulating rack bar 14 of the typewriter carriage has settable thereon lugs 15 preferably formed as extensions of tabulating stops 16 (which stops coöperate with the usual countor stops not shown); said lugs as they travel along with the typewriter carriage to the left intermittently intercept a hook or latch 17, said hook formed on the end of a draw rod 18, which draw rod, by means of a lever 19 pivoted intermediate its ends, moves the computing carriage 12 to the right as the typewriter carriage 8 moves to the left. Said computing carriage 12 includes a master wheel 20 slidably splined on a power shaft 19$^a$, which master wheel 20 is normally drawn by a spring 21$^a$ attached to the lever 19 so as to stand a letter space or two above the highest computing wheel 3 of the totalizer 13. When, however, the hook 17 is caught by one of the lugs 15, the master wheel 20 is drawn to the right with each letter-feeding movement of the typewriter carriage to engage *seriatim* with the computing wheels 3 of the totalizer 13 until the master wheel 20 would pass beyond the units dial wheel 3 of the totalizer 13. At this moment the hook 17 is drawn out of engagement with the lug 15 by a cam 21 on its surface, said cam riding down under a releasing pin 22 which carries the hook 17 clear of the lug 15, thus permitting the spring 21$^a$ to draw the master wheel 20 above the highest computing wheel.

In the present illustration, it is assumed that on some previous day items shown in the second column 23 of the bill 6 have been registered, said items being $2.00, $1.25 and $20.00, making a total of $23.25, which has been written in the third or daily total column 24, and finally carried out into the daily balance or last column 25 of the bill 6. Said bill comprises a leaf 26, and a stub 27, said leaf being attached to said stub at the perforated line 28, so that the leaf at any suitable time may be detached from the stub and sent to the customer. Said leaf is folded over at the perforated line 28, and a carbon paper, not shown herein, is interposed between said leaf and the stub, so that a complete copy of the bill will be kept on the stub to be retained in the office. Said stub may be used partly for verifying the work of the operator. For this purpose the stub is made to extend somewhat to the left of the bill as viewed in Fig. 1, and on a check column 29 of this stub, at the beginning of making out the bill for the day, the operator copies the total shown in the previous daily balance, which in the present instance is $23.25. The copying of this total onto the stub is arranged to automatically register the amount in the cross totalizer 13, as diagrammatically shown in Fig. 6. The connections for accomplishing this include a lug 15$^a$ set at the left-hand end of the typewriter carriage 8 (see Fig. 1), which when the check column 29 is moved to position at the printing point will, by the previously described connections, draw the master wheel 20, so as to cause the number written by the numeral keys of the typewriter to be registered in the totalizer 13. This transfers the previous daily balance into said totalizer. The operator then may move the typewriter carriage along, bringing the item column 23 to the printing point, and then write the items $1.00, $.50 and $10.00, which, as shown in Figs. 1 and 7, will be registered in the totalizer 2, by the master wheel 4 and also added to the $23.25 previously shown in the cross totalizer 13, said cross totalizer being at this point connected to the typewriter carriage by a lug 15$^b$ on one of the stops 16, as seen in Fig. 1.

The operator next moves the typewriter carriage to insert in the daily charge column 24 the total shown in the item totalizer 2. Before so writing this total, the operator shifts a lever 30 to throw over a reversing clutch 31 (see Fig. 8) in the computing train between the numeral keys and the master wheel shaft 32, on which the master wheel 5 is fast, thus causing said master wheel to be turned in the opposite direction when the daily total is written in the daily total column 24.

The master wheel 4, which now engages the grand totalizer 1, is arranged to add into the daily total or grand totalizer 1 the daily total which is being subtracted from the totalizer 2. To bring about this result the two master wheels 4 and 5 are fast on the same shaft 32, but the numerals 33 on the dial or numeral wheels of the totalizer 2 (see Fig. 3) are arranged in the opposite order from the numerals 34 on the dial wheels 3 of the totalizer 1 (see Fig. 4). The result of this arrangement, as is obvious, causes a number added in the one totalizer to be subtracted from the other, when the two totalizers are simultaneously operated. The result then of subtracting the daily total, $11.50, out of the totalizer 2, is to add it into the grand totalizer 1 automatically.

During this operation of writing the daily total $11.50 in the column 24, the cross totalizer 13 is kept ineffective, because the items forming this total have already been registered therein; thus it remains at $34.75 to which its wheels were turned in adding the $1.00, $.50 and $10.00 from column 23. The operator having no further items to record, shifts the typewriter carriage so as to write the balance or total shown on the cross totalizer 13 on the bill in the column 25. Just before writing said amount, the operator (see Fig. 9) shifts the handle 35 of a reversing clutch 36 in the computing train between the numeral keys and the master wheel 20, so as to cause any number written by the numeral keys to be subtracted out of said cross totalizer 13.

The operator now in writing the balance $34.75, shown in said cross totalizer, automatically subtracts out or erases said balance from the totalizer, thus finishing the operation on that bill for that day. This leaves the item totalizer 2 and cross totalizer 13 at zero.

On some later day the operator is instructed to make a cash credit of $10.00 on this bill. To do this the operator proceeds as before to copy onto column 29 of stub 27 the last daily balance, $34.75 shown in column 25, in the manner shown at the diagram in Fig. 6, and as described for the total $23.25 above. It should be remembered that this is done with the clutch 36 set at adding, as seen in Fig. 6. This, as above described, will register said previous daily balance in said totalizer. The operator now shifts the typewriter carriage to bring the printing point at the credit column 37. This connects the computing machine carriage 12 to the lug 15$^c$, which corresponds to the column 37, causing the numbers written in said column to be registered in the cross totalizer 13. Before writing in said column, the operator shifts the lever 35 to subtraction, as shown diagrammatically in Fig. 9, and the lever 30 to neutral, and then writes in said column the desired credit item $10.00. This subtracts said item from the cross totalizer 13, which then shows the balance $24.75, seen in Fig. 10. There being no other items to be recorded on this day, the operator shifts the typewriter carriage to write in the daily balance column 25 and leaving the shift lever 35 set at subtraction (as in Fig. 9), he copies in said column 25 the balance shown on the cross totalizer 13. This subtracts said daily balance from said totalizer, thus bringing the wheels therein to zero, and proving the result by the fact that the wheels are brought to zero.

When it is desired to have a separate totalizer for the credit items which are entered in column 37, the connections may be made as shown diagrammatically in Fig. 10, wherein the credits totalizer is shown at 55 arranged to be operated by a master wheel 56 on the shaft 32 on which shaft master wheels 4 and 5 are likewise fast.

As has been described above, the items of column 23 are footed up on totalizer 2, said totalizer being operated by the master wheel 4. To write in the next column, the typewriter carriage is positioned to bring the totalizer 1 over the master wheel 5, which simultaneously shifts the totalizer 2 to a master wheel 57. The clutch reversing levers 30 and 35 are shifted to set them as seen in Fig. 7 as described above, and the operator in now writing the daily total in column 24 will, as described above, erase the total shown in totalizer 2, and adds said total to the totalizer 1. If the operator wishes to enter a credit in the credit column 37, he moves the typewriter carriage to write in that column, thus bringing the credit totalizer 55 to a point where it is engaged by the master wheel 56 on the master wheel shaft 32. If both the clutch reversing levers 30 and 35 are set at subtraction, said credit item will be added in the credit totalizer 55, and subtracted from the cross totalizer 13. This is accomplished by having the numerals on the numeral wheels 33 of said totalizer running in the same direction as they do in the totalizer 1. Having said numerals arranged this way is not essential but preferable, because it enables one shifting of the reversing lever 30 to be dispensed with in writing a credit.

It will be understood in the above outline that the cross totalizer has been connected up by means of the lug 15° in the manner described for operating a machine where there is no credit totalizer employed. Said credit totalizer has the same kind of carry-over assisting roll 49 as is provided for the other totalizers.

It will be observed that the amounts shown in column 29 of the stub 27 are merely check numbers to show that the operator in working with each bill started the computation for that day correctly. Furthermore, when each bill is removed from the machine with its balance carried out into the daily balance column, the totalizers 2 and 13 will both stand at zero, if the work has been done correctly.

The grand totalizer 1, when each bill has been removed, will show the total of the charge items on the bills made out or extended on the machine during the day. At the end of the day, said total may be copied out onto a daily sales slip by inserting said slip in the machine, placing the shift lever 30 to cause the number registered in the grand totalizer 1 to be subtracted out, and then copying said total onto the daily sales slip. If this is done correctly the totalizer 1 will be brought to zero.

One of the advantages of my invention is that both sub-totalizing and grand totalizing can be performed while cross-adding is simultaneously being automatically done, and all these operations require the use of only two master wheel shafts. The result of having two totalizers operated by a single master wheel shaft so that in certain columns one always subtracts while the other adds is obvious, since this enables the operator to always positively trace out any errors that may be made in transcribing, for neither the sub-totalizer nor the grand totalizer can be reversed independently of the other. Thus the correction of an error in one will automatically correct the error in the other.

The master wheels of the present invention may be driven by power, as disclosed in the patent to Degener, No. 1,020,082 of March 12, 1912, wherein the motor, not shown herein turns the drive shaft 39 to which the clutches 31 and 36 are splined, to an extent determined by the numeral keys depressed.

The totalizers shown herein are of the same general type as those set forth in said Patent No. 1,020,082. Each numeral wheel 3 is constantly in mesh with its computing wheel 40, said computing wheel having internal teeth 41, through which are adapted to slide the teeth 42 of a master wheel 43. Each computing wheel is constantly in mesh with a carry-over wheel 44, by which it may be turned when the computing wheel next lower in denomination should "carry over", viz., when said lower computing wheel brings its zero to the sight opening 45 of the totalizer.

To accomplish this result each computing wheel 40 is provided with a broad tooth 46, which once in each revolution of said wheel 40 (at the time the zero on its numeral wheel 3 turns to the sight opening 45) will engage one of five teeth 47, forming part of the adjacent carry-over wheel 44, and give said carry-over wheel a slight turn so that interrupted gear teeth 48 on said wheel will engage a resilient carry-over assisting roll 49, said roll being fast on a power driven shaft 50 connected to the motor. The turning given each carry-over wheel by the broad tooth 46 of the computing wheel is insufficient to do more than start the carry-over wheel, but the turning of the carry-over wheel through one-fifth of a revolution is completed by the carry-over assisting roll 49, said roll being provided with teeth 51 which engage the teeth of the interrupted gear teeth 48 on the carry-over wheel and turn said carry-over wheel until another interrupted portion of the gear 48 is adjacent the assisting roll 49. Each carry-over wheel is half the size of the computing wheel with which it meshes, so that turning a carry-over wheel through a fifth of a revolution turns its computing wheel a tenth of a revolution, viz., turns it to bring a numeral opposite the sight opening 45 adjacent the numeral previously shown there.

Overthrow of the carry-over wheels is prevented by a spring-pressed detent roller 52, of which there is one for each carry-over wheel, said rollers bearing against hollows 53 formed in the interrupted portions of the interrupted gear 48. Said detent rollers 53 not only serve to prevent overthrow of the carry-over wheels, but since each carry-over wheel is constantly in mesh with its numeral wheel, each detent roll 53 will hold its numeral wheel 3 alined.

Variations may be resorted to within the scope of the invention, and portions of the improvements may be used without others.

Having thus described my invention, I claim:

1. In a computing machine, the combination with a carriage having two totalizers thereon, of a shaft having two master wheels, means for operating said totalizers simultaneously by said master wheels to add on one totalizer and subtract on the other, and means for cross-footing the added numbers.

2. In a computing machine, the combination with a carriage having two totalizers thereon, of a shaft having two master wheels thereon, means for operating said master wheel shafts, and means for producing relative movement between said totalizers and master wheels, so that one totalizer is operated by one master wheel while the other master wheel is idle, and so that the other totalizer is operated by the first master wheel and the first totalizer is operated by the previously idle master wheel, so as to simultaneously add in one totalizer and subtract in the other when the carriage and totalizers occupy a different position.

3. The combination with two totalizers and a master wheel shaft, of master wheels on said shaft for operating said totalizers simultaneously so that one will add and the other subtract, a cross totalizer, a single separate master wheel for said cross totalizer, and means for connecting the master wheel of said cross totalizer to add or subtract independently of the other master wheels but simultaneously therewith.

4. The combination with a typewriter carriage, of a computing carriage connected thereto, a sub-totalizer, a grand totalizer, a shaft having master wheels for operating said totalizers, said computing carriage being connected to effect relative movements between each master wheel and the totalizers, a cross totalizer, a computing carriage independently connected to effect relative movements between said cross totalizer and its master wheel, means for connecting said two computing carriages so that they move simultaneously, said sub-totalizer and grand totalizer being so connected to be operated by their master wheels that one always automatically adds when the other subtracts when both are engaged by their master wheels, and means for manually determining whether the subtotalizer shall add or subtract.

5. In a combined typewriting and computing machine, the combination with two totalizers, of master wheels arranged to engage them successively and simultaneously, the parts of said totalizers being so arranged that when they are operated together one will add while the other subtracts, a single shaft to which said master wheels are fast, a cross totalizer adapted to be connected intermittently to be operated simultaneously with either of said first totalizers, means for reversing said single shaft, and means for separately reversing said cross totalizer.

6. In a combined typewriting and computing machine, the combination with two totalizers, of common controlling means for reversibly operating them together so that one automatically adds while the other subtracts, one of said totalizers being operable independently of the other, a third totalizer automatically connectible to be operable simultaneously with one of said two totalizers to add, means for separately operating said third totalizer to subtract, and numeral keys forming part of said typewriting machine and controlling the operation of said totalizers.

7. The combination with a unitary pair of removably adjustable totalizers, of a single shaft for operating said totalizers, a master wheel for each totalizer fast on said shaft, wheels in said totalizers so arranged that if the two totalizers are operated simultaneously by said shaft, one of said totalizers always adds if the other subtracts, a cross totalizer operable simultaneously with either or both of said totalizers, manual means settable to determine whether said cross totalizer shall add or subtract, and typewriting means for so operating said totalizers.

8. In a combined typewriting and computing machine, the combination with a platen, of totalizers arranged to add or subtract numbers written in definite columns on said platen, a master wheel shaft and master wheels on said shaft for automatically operating said totalizers simultaneously so that one adds while the other subtracts, said master wheels also adapted to operate one of said totalizers independently of the other to either add or subtract, a cross totalizer manually settable to add or subtract, and means for automatically connecting said cross totalizer to be operated simultaneously with one of said first-named totalizers while said totalizer adds, said cross totalizer also connectible separately to add or subtract.

9. In a combined typewriting and computing machine, the combination with a computing machine carriage and two totalizers thereon, of a single shaft for operating said two totalizers, a master wheel for each totalizer fast on said shaft, means for simultaneously turning said shaft and printing the numbers represented by the turning of said shaft, a separate totalizer having a separate shaft adapted to be similarly turned while printing, means for manually separately setting said shaft connections to turn the shafts in either direction when printing is done, and means whereby when said first two totalizers are operated simultaneously, one will always subtract while the other is adding, and vice versa.

10. In a combined typewriting and computing machine, the combination with a typewriter carriage, of a computing carriage, two totalizers, a single shaft, two master wheels fast on said shaft, said computing carriage adapted to cause said master wheels to engage computation wheels *seriatim* in each of said totalizers, said master wheels so related to said totalizers that if they each engage a totalizer, one totalizer is adding and the other subtracting, a second computing carriage connectible intermittently to travel step by step with the first computing carriage, a third totalizer, a third master wheel engaging *seriatim* the computation members of said third totalizer as controlled by said second computing carriage, a drive shaft for driving said master wheels, and reversible connections between said drive shaft and said master wheel shaft and said third master wheel.

11. In a computing machine, the combination with a traveling carriage, of two totalizers, and master wheels for operating said two totalizers, said master wheels being on a single shaft and so related to said totalizers that when one adds the other subtracts when they are operated simultaneously.

12. In a computing machine, the combination with a traveling carriage, of two totalizers, master wheels for operating said two totalizers, said master wheels being on a single shaft and so related to said totalizers that when one adds the other automatically subtracts if they are operated simultaneously, one of said totalizers also adapted to be operated independently of the other by one of said master wheels, and a cross totalizer adapted to be successively operated in either direction simultaneously with at least one of said totalizers.

13. In a computing machine, the combination with a master wheel driving shaft, a master wheel thereon, of two totalizers arranged to be operated one after the other by said master wheel, a second master wheel on said shaft for operating one of said totalizers simultaneously with the operation of the other totalizer by the first mentioned master wheel, the numbers on one of said totalizers running the reverse of the numbers on the other, a cross totalizer and means for determining at any time whether said cross totalizer shall register additively or subtractively in connection with either or both of said first mentioned totalizers.

14. The combination with a pair of totalizers, each including a plurality of computing wheels, the numbers ascending in one direction on the wheels of one of said totalizers and ascending in the opposite direction on the wheels of the other of said totalizers, and means operated under a common control for simultaneously actuating said totalizers in unison to run up the same digits thereon, said means also adapted to operate one of said totalizers while ineffective on the other.

15. The combination with a unitary pair of twin totalizers each having a series of number wheels, the digits ascending in opposite directions on the number wheels of the two totalizers held in definite relation with respect to each other, of a pair of master wheels, a shaft for driving said master wheels, said master wheels being fixed on said shaft at a definite spaced relation corresponding to the spaced relation of the center lines of said twin totalizers, and traversing means for effecting a relative movement between said totalizers and said master wheels, so that one of said master wheels will first drive one of said totalizers, and then drive the other of said totalizers, while the other of said master wheels drives the first totalizer.

16. The combination with a unitary pair of twin totalizers held in definite relation with respect to each other, of a pair of master wheels, a shaft for driving said master wheels, said master wheels being fixed on said shaft at a definite spaced relation corresponding to the spaced relation of the center lines of said twin totalizers, said totalizers and master wheels being so arranged that one totalizer adds while the other subtracts, traversing means for effecting a relative movement between said totalizers and said master wheels, so that one of said master wheels will first drive one of said totalizers, and then drive the other of said totalizers, while the other of said master wheels drives the first totalizer, a cross totalizer, means settable to automatically cause said cross totalizer to operate with either or both of said unitary totalizers, and manual means adjustable to cause said cross totalizer to add or subtract.

17. The combination with a grand totalizer and an item totalizer each of said totalizers having numeral wheels, the digits ascending in opposite directions on the wheels of the two totalizers, of master wheels connected for rotation together in the same direction for operating said totalizers either simultaneously or individually, a cross totalizer, a single master wheel therefor, means whereby said cross totalizer may either add or subtract or remain idle when the first of said totalizers is adding or subtracting.

FRANK A. ROBINSON.

Witnesses:
GEO. W. NAYLOR,
JULIUS DUCKSTINE.

Copies of this patent may be obtained for five cents each, by addressing the "Commissioner of Patents, Washington, D. C."